(12) United States Patent
Ooe et al.

(10) Patent No.: US 7,003,556 B2
(45) Date of Patent: Feb. 21, 2006

(54) STORAGE SYSTEM AND A METHOD FOR UNILATERALLY ADMINISTERING DATA EXCHANGE WITH THE STORAGE SYSTEM

(75) Inventors: Kazuichi Ooe, Kawasaki (JP); Katsuhiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/860,523

(22) Filed: May 21, 2001

(65) Prior Publication Data

US 2002/0065916 A1   May 30, 2002

(30) Foreign Application Priority Data

Nov. 27, 2000  (JP)  .............................. 2000-359810

(51) Int. Cl.
*G06F 13/00*   (2006.01)
(52) U.S. Cl. .................................................... 709/219
(58) Field of Classification Search ................ 709/200, 709/203, 213, 214, 216, 217, 218, 219, 223, 709/224, 225, 201; 711/100, 101, 111, 112, 711/113, 117, 118, 126, 147; 718/105, 102
See application file for complete search history.

(56) References Cited

U.S. PATENT DOCUMENTS 5,548,724 A * 8/1996 Akizawa et al. ............ 709/203

* cited by examiner

*Primary Examiner*—Robert B. Harrell
(74) *Attorney, Agent, or Firm*—Staas & Halsey LLP

(57) ABSTRACT

There is provided a storage system including a storage unit capable of storing therein file data, a plurality of file servers for effecting file processing on the storage unit in response to a file request concerning file data which is received from a client through an external network, a file server administrating node for unitarily administrating transfer processing for transferring the file data to the file server based on the file request and reply processing for sending a reply message concerning the file request to the client, and an internal network for interconnecting the storage unit, the file servers and the file server administrating node so that communication can be effected in the internal network. According to the foregoing arrangement, it is possible for the storage system to have satisfactory scalability capable of coping with the expansion of band of the network at a low cost.

43 Claims, 16 Drawing Sheets

121, 131: HANDOVER INFORMATION RECORDING UNIT
132: NFS SERVER MONITORING DAEMON
133: NAME SERVER MONITORING DAEMON
134: ABNORMAL INCIDENT DETECTING UNIT
135: HANDOVER INSTRUCTING UNIT

BOUNDARY

STORAGE SYSTEM AND A METHOD FOR UNILATERALLY ADMINISTERING DATA EXCHANGE WITH THE STORAGE SYSTEM

BACKGROUND OF THE INVENTION (1) Field of the Invention

The present invention relates to a storage system, and more particularly to a storage system which allows a plurality of clients involved in any network to share file data if the storage system is connected to the network.

(2) Description of Related Art

As a conventional scheme of operating a network in which file data is shared by a plurality of nodes (clients) (hereinafter simply referred to as file sharing), there can be introduced a well-known manner in which, as for example schematically shown in FIG. 16, a file server 200 is built in any network 100 such as a LAN (Local Area Network) by utilizing an NFS (Network File System), and the file server 200 is connected with a secondary storage unit 400 through an interface 300 such as a so-called SCSI (Small Computer System Interface), and the file is shared by a plurality of clients 500 through the secondary storage unit 400.

The above-introduced manner, however, can encounter the following problems.

(1) Highly developed skill is requested for a person who is under duty of building the file server system and maintaining the same.

(2) It is not easy to expand the file server system (in its capacity, accessing performance or the like). If the system can be apparently expanded, one file server is unavoidably divided into a plurality of units and the entire number of units constituting the system becomes large, with the result that the maintenance cost for the system is also increased.

(3) Also, highly developed skill is requested for a person who is under duty of building the file server system and maintaining the same when the system suffers from any failure. Accordingly, the cost therefor will be expensive.

As a method for solving the problems, recently, there are proposed a method known as an NAS (Network Attached Storage). The NAS is equivalent to a unitarily built storage system including the file server 200 and the secondary storage unit 400 (see the portion surrounded by broken line in FIG. 16). If the NAS is connected to the network and simple setting operation is executed, the clients involved in the network can share data file, and further highly developed skill is unnecessary for a person under the duty of building the system and maintaining the same.

However, the above-described NAS still encounters a problem that it does not have satisfactory scalability for coping with the expansion of the transmission rate (in the current status, the transmission rate is of about 1 Gbps, which is expected to reach about 10 Gbps in several years in the future) of an LAN which is now progressively deployed. In other words, if the communication system is arranged so as to deal with the network as a connection destination which is increasing in the transmission rate, it is unavoidably required to increase the number of file servers and secondary storage units provided within the NAS. As a result, a component which functions as the file server is divided into a plurality of components, and a component which functions as the secondary storage unit managed by the file server is also divided into a plurality of components.

That is, the above file server 200 and the secondary storage unit 400 are arranged as processing channels functioning in a parallel manner (independent manner). For this reason, it becomes necessary to carry out maintenance on each of the file server components, with the result that the maintenance cost will be increased.

SUMMARY OF THE INVENTION

The present invention seeks to solve the above problems. Therefore, it is an object of the present invention to provide a storage system having satisfactory scalability capable of coping with the increase of transmission rate of the network with low cost.

According to the present invention, in order to attain the above object, there is provided a storage system including a storage unit capable of storing therein file data, a plurality of file servers for effecting file processing on the storage unit in response to a received request, a file server administrating node for unitarily administrating transfer processing for transferring a client request received via an external network as the received request to one of the plurality of file servers based on the client request and reply processing regarding the client request to the client, and an internal network for interconnecting to the storage unit, the file servers, and the file server administrating node so that communication is effected in the internal network.

According to the above storage system of the present invention, the network is provided with an additional file server or storage unit depending on necessity. Furthermore, it is unnecessary to carry out maintenance on each of the file servers independently. Therefore, it becomes possible to provide satisfactory scalability in performance and capacity with low cost for an external network which transmission rate is increased.

In this case, the internal network may be connected with a name server which unitarily administrates the names of file data handled by the file servers. Also, the internal network may be connected with a shared memory which the file server administrating node and the file servers are made allowable to access. If the network is arranged to include the name server, in addition to the file server administrating node and the file servers, the name server will be made allowable to access the shared memory.

As described above, when the internal network is connected with the name server which unitarily administrates names of all the file data handled by the file servers, it is possible to create a name space which allows any of the file servers to have access to one and the same file via one and the same name path.

Furthermore, as described above, if the internal network is connected with the shared memory, the shared memory may be implemented to have handover information stored therein, as required, so that the file servers can exchange handover information through the shared memory to overcome a trouble which any of the file servers suffer from. With this arrangement, even if any of the file servers experience a problem, the storage system will continue normal operation. Therefore, the communication system becomes more durable against problems in the network.

Further, according to the present invention, it is more preferable for the file server administrating node to be arranged to include a request analyzing unit for analyzing the contents of the request and a request transferring unit for transferring the request to a specified file server in accordance with the result of analysis of the request analyzing unit.

Further, the file server administrating node may be arranged so that a request regarding file data having an identical file data name is transferred to the same file server, based on data of the transferring operation history accumulated so far. According to the arrangement, processing speed will be remarkably improved. Further, the file server administrating node may be arranged to monitor the file servers to find a file server having relatively light load applied thereto and the request is transferred to the file server having relatively light load applied thereto. With this arrangement, each of the file servers will receive the requests evenly, thereby reliably avoiding a lot of load from being intensively applied to a particular file server, and avoiding a trouble caused by such an incident.

Further, file data, which request occurrence frequency is relatively high, may be cached in the main storage unit of the cache server so as to be processed by the cache server. With this arrangement, it becomes possible to remarkably reduce the access frequency to the storage unit, further improving the processing speed and processing performance.

In this case, the storage system may be arranged so that when the request occurrence frequency for the file data which is cached in the main storage unit of the cache server stays below a predetermined level, any server other than the cache server may succeed the processing of the request. With this arrangement, the cache server is relieved from holding the file data of which request occurrence frequency is no longer high for a long period of time. Therefore, the size of memory area, to be reserved in the cache server as the main storage unit, can be reduced, and the cache server will have more allowance in processing data, further improving the processing performance of the cache server.

Further, the file server administrating node may be arranged so that a header offset value indicative of the position of the boundary between the header portion and the substantial file data portion is calculated, and the header offset value is added to the request and transferred to the file server together with the request. With this arrangement, in a network driver of the file server, the header portion and the data portion of the request can be copied on respective different regions for message which are handled by a higher rank layer of the kernel, based on the header offset value. Therefore, no copy will be required in the kernel region, remarkably improving the processing speed and processing performance of the file server.

Further, the above-described file server administrating node may be arranged so that a reply message, to a request corresponding to a particular file data of which request occurrence frequency is relatively high, is cached. When a request corresponding to the file data is received, the cached reply message is returned to the client. With this arrangement, since the request need not be transferred to the file server, the responding speed for the client can be remarkably improved and hence the processing speed and the processing performance of the whole communication system can be dramatically improved.

The above-described storage unit may be arranged so that the storage unit permits access from an external node. With this arrangement, the storage system can be easily combined with another type of storage architecture. In this case, the name server may be also arranged to permit access from the external node. With this arrangement, the external node is allowed to have access to file data without arbitration control between the file server and the external node upon accessing the file.

Further, the above-described file server may be arranged to carry out file processing on the storage unit so as to respond to a request which is directly received from the external network. With this arrangement, the client is allowed to have access to the storage unit in a direct manner and in a manner via the file server. Also in this case, the storage system can be easily combined with another type of storage architecture.

DESCRIPTION OF THE PREFERRED EMBODIMENT

Embodiments of the present invention will be hereinafter described with reference to drawings.

(A) Description of First Embodiment

Figure 1:
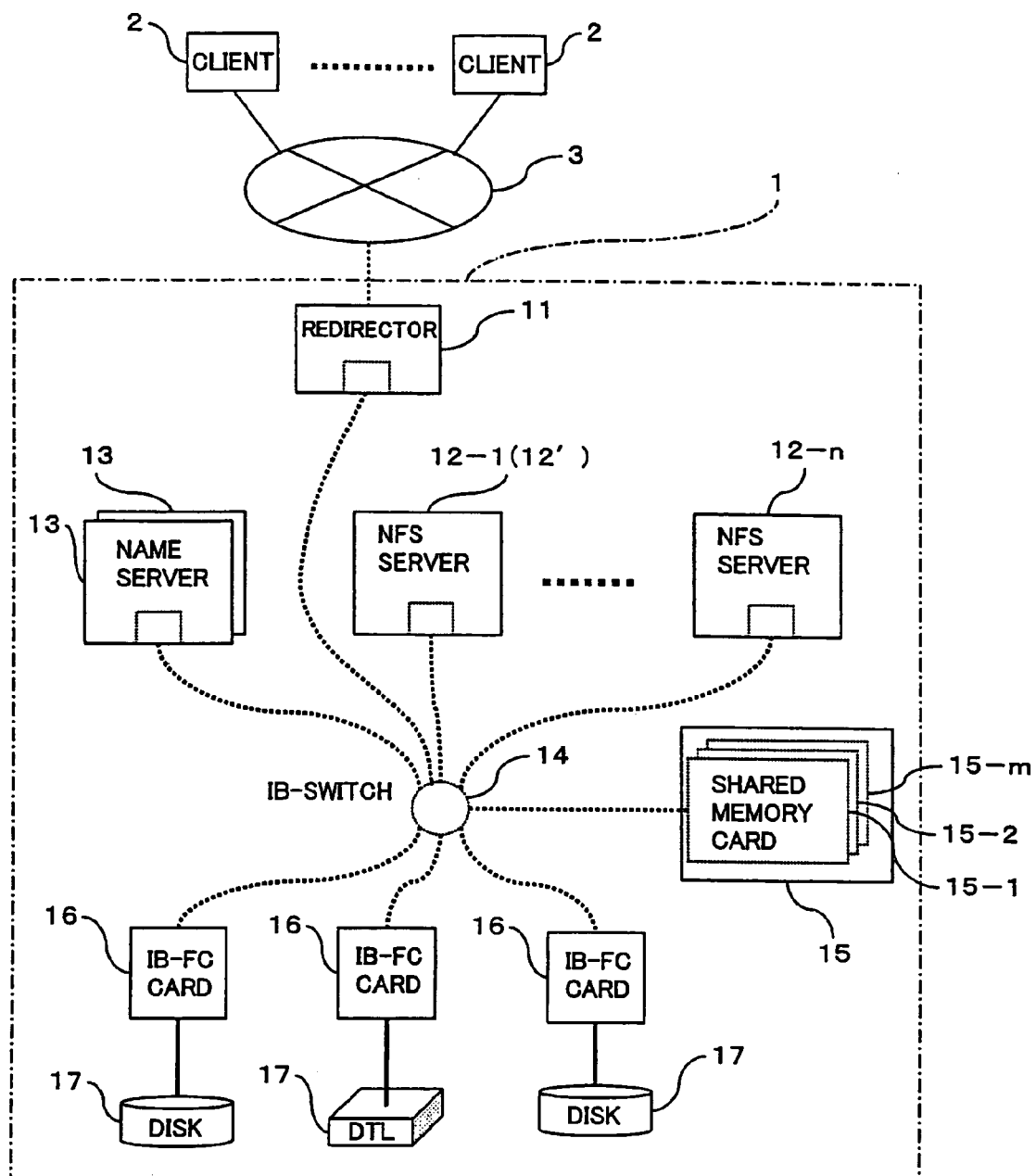
FIG. 1 is a block diagram showing an arrangement of a storage system (storage architecture) as one embodiment of the present invention.

FIG. 1 is a block diagram showing an arrangement of a storage system (storage architecture) as one embodiment of the present invention. As shown in FIG. 1, a storage system 1 (hereinafter sometimes simply referred to as "system 1") is a system which allows a plurality of clients 2, connected with an external network 3 (e.g., gigabit Ethernet) to share file data. In order to attain this purpose, the storage system 1 includes a redirector 11, a plurality of NFS servers (file servers) 12-1 (12') to 12-n, a name server(s) 13, a shared memory 15 (15-1 to 15-m), an IB-FC card 16, secondary storage unit(s) 17 (hard disk drive unit, tape recording unit (DTL) or the like) and so on. Further, the components 11, 12-1 (12') to 12-n, 13, 15-1 to 15-m, 16, and 17, shown in FIG. 1, are interconnected to one another through a high speed (internal) network (Infiniband) switch 14 of which transfer speed is about 4 to 10 Gbps, for example.

As described above, components of the internal system (redirector 11, the NFS servers 12-i to 12-n, the name server(s) 13, the secondary storage unit(s) 17 and so on) are connected with another through the internal network 14 so that the network is composed of a number of clusters. Therefore, the network has a scalability for components such as the NFS servers 12-1 (12') to 12-n, the secondary storage unit(s) 17 or the like, i.e., the NFS servers 12-1 (12') to 12-n, the secondary storage unit(s) 17 or the like can be additionally connected with the internal network 14 with ease and depending on necessity. Thus, the internal network 14 has a remarkably improved scalability in capacity, access performance, etc., depending on the transmission speed of the external network 3 connected with the internal network.

The above-described redirector (file server administrating node) 11 is a unit for carrying out transfer processing such that various request messages (hereinafter simply referred to as "request") received from any one of the clients 2 through the external network 3 are transferred to any of the NFS servers 12-i (i=1 to n). The redirector 11 also functions as a unit for unitarily administrating the reply message sending operation for each of the request to the clients 2 as a request source. That is, using the redirector 11, even when the NFS server 12-i, the secondary storage unit 17 or the like is additionally provided in the internal network as described above, it is unnecessary to rearrange the maintenance service mode for the additional components, unlike the conventional network.

The above term "request" means a request for file data (hereinafter sometimes simply referred to as "file") stored in the secondary storage unit 17. For example, the meaning of this term includes a request (file access request) for file operation to the substance of the file data and some other request such as a request for access to meta-information such as file name reference or the like. Further, each of the clients 2 is allowed to refer only to an IP (Internet Protocol) given to the redirector 11. That is, from each of the clients 2, the present system 1 can be observed as if the plurality of components constituting the system were a single integrated server.

Figure 2:
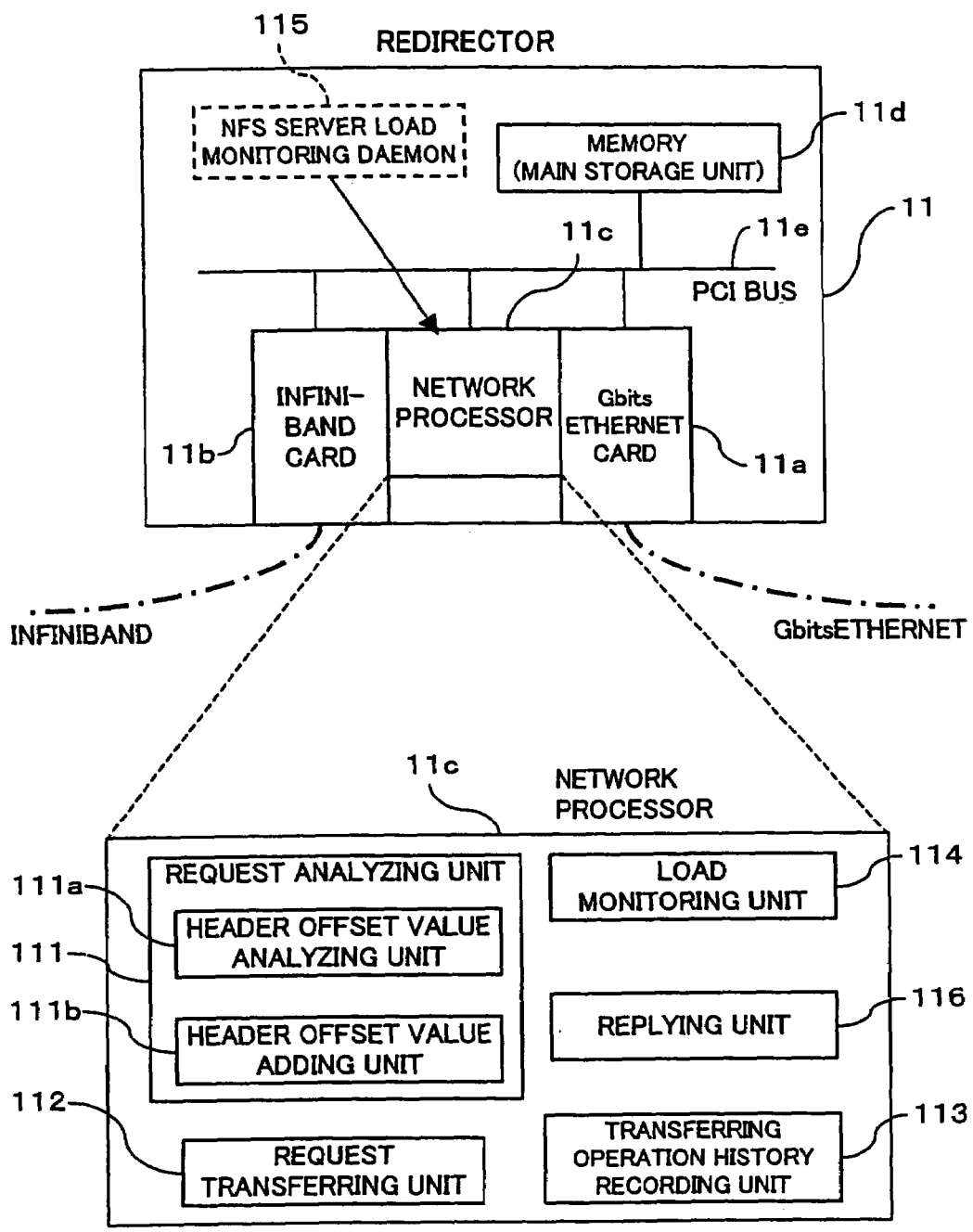
FIG. 2 is a block diagram showing an arrangement of a redirector shown in FIG. 1.

In order to realize the above-mentioned functions, as for example shown in FIG. 2, the redirector 11 is arranged to include a gigabit Ethernet card 11a equipped with an interface for the external network 3 (shown in FIG. 1), an infiniband card 11b equipped with an interface for the system internal components (internal network), a network processor 11c for intensively controlling the operation of respective cards 11a and 11b including the redirector 11 itself, and a memory (main storage unit) 11d for storing therein various data and a software (program) necessary for operating the network processor 11c.

The network processor 11c is interconnected to these components 11a to 11d through a PCI (Peripheral Component Interconnect) bus 11e so that they can communicate with one another.

In this case, the network processor 11c is a unit capable of receiving and sending (including conversion of protocol) a request and a reply message therefor exchanged between the internal network 14 and the external network 3. The network processor 11c is also capable of analyzing the request (protocol) received from the clients 2, deciding an access file name based on the analyzing result, and deciding a destination NFS server 12-i of the received request. According to the present embodiment, the network processor 11c is further designed to carry out the following control.

That is, the network processor 11c analyzes the request from the clients 2, controls the request transfer operation so that jobs deriving from the requests are evenly distributed to respective NFS servers 12-I to 12n (e.g., to distribute request preferentially to an NFS server 12-i having a relatively light load applied thereto), assigns a server to the request so that a request about the same file is allocated to the same server, preventing contention for file access in the NFS Servers 12-i to 12n.

To this end, the subject network processor 11c is arranged to include the following functional components as its main function.

(1) A function as a request analyzing unit 11 for analyzing the contents of the request sent from the client 2.

(2) A function as a request transferring unit 112 for transferring the received request to one of the NFS servers 12-i to 12n in accordance with the result of analysis executed by a request analyzing unit 111.

(3) A function as a transferring operation history recording unit 113 for recording transferring operation history of a request which was handled so far by the request transferring unit 112 (e.g., history of transferring the request to the memory 11d).

(4) A function as a load monitoring unit 114 for periodically monitoring the load applying condition of respective NFS servers 12-i, by effecting an NFS server load monitoring daemon 115 as the background task.

With this arrangement, the request transferring unit 112 transfers a request with respect to a file having the same file name to the same NFS server 12-i (one of the NFS servers 12i to 12n) based on the transferring operation history recorded in the transferring operation history recording unit 113. Also, the request transferring unit 112 transfers the received request to an NFS 12-i having relatively light load based on the result of load monitoring effected by the NFS server load monitoring daemon 115 (load monitoring unit 114).

Accordingly, the processing speed of the system will be remarkably improved. Furthermore, the requests can be evenly distributed to respective NFS servers 12-i. Therefore, each of the NFS servers 12-i can be reliably prevented from being applied with heavy load intensively. Thus, the reliability of the system can be remarkably improved.

Figure 3:
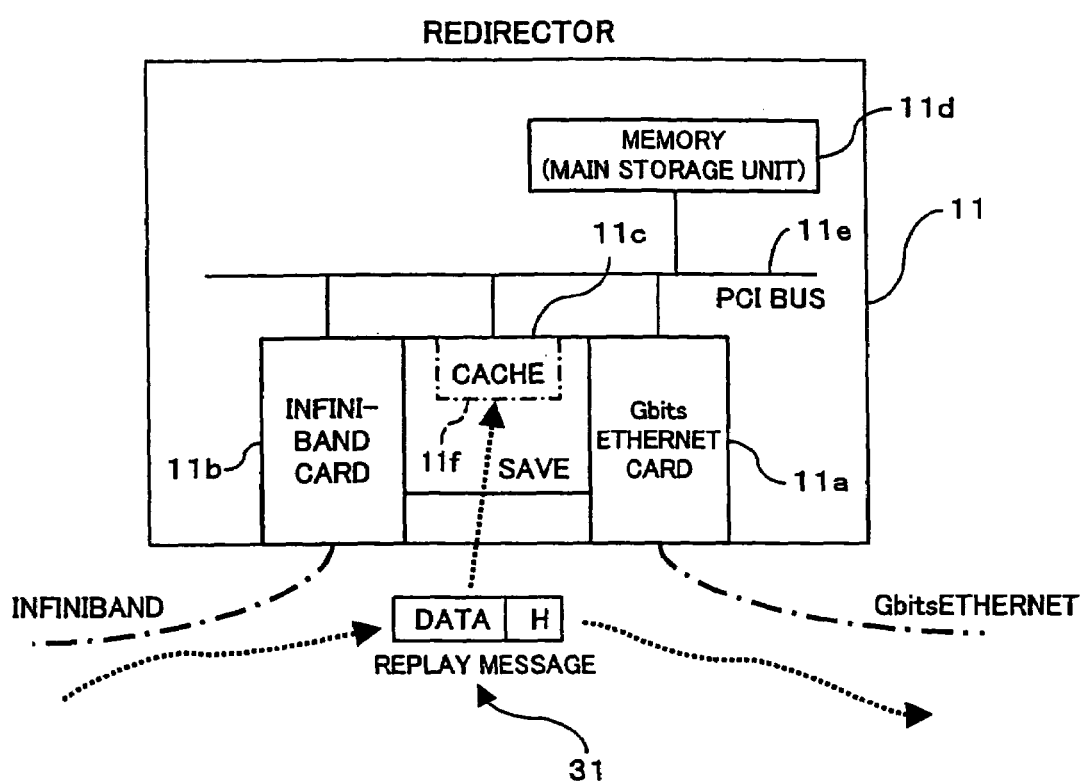
FIG. 3 is a block diagram for explaining an operation in which the redirector shown in FIG. 1 caches meta-information.
Figure 4:
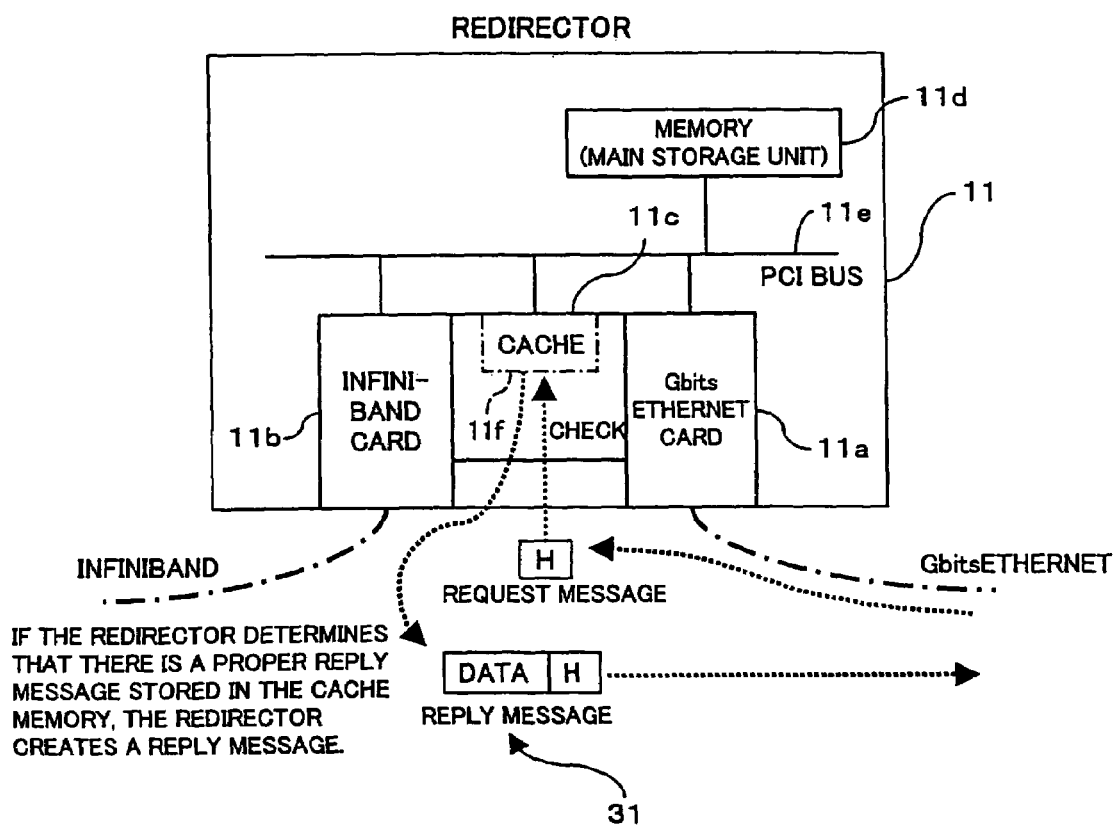
FIG. 4 is a block diagram for explaining an operation in which the redirector shown in FIG. 1 returns a reply message.

According to the arrangement of the subject network processor 11c, a cache memory 11f (memory 11d may replace for the cache memory 11f) is provided within the network processor 11c so that a handover message for access to meta-information is reserved in the cache memory 11f (see FIG. 3). When the redirector 11 receives a request of access to the meta-information from the client 2, the redirector 11 checks whether there is proper reply message stored in the cache memory 11f (or the memory 11d) or not. If the redirector 11 determines that there is a proper reply message stored in the cache memory 11f (or the memory 11d), the redirector 11 creates a reply message based on the reserved message and sends the reply message directly to the client-2 side (i.e., without sending the message through the NFS server 12-*i* or the name server 13) (see FIG. 4).

The above-described arrangement can be applied to not only the meta-information but file data. However, if the all kinds of file data are cached, the memory is required to have a capacity large enough to accommodate such storage. Therefore, it is preferred to arrange only file data, which has relatively high access occurrence frequency, is selected by the network processor 11*c* to be cached by the cache memory 11*f* (or the memory 11*d*).

That is, the cache memory 11*f* (or the memory 11*d*) functions as a cache unit for caching a reply message to be sent to the client about a particular file data which has relatively high request occurrence frequency. Further, the network processor 11*c* functions as a replying unit 116 (see FIG. 2) for returning the reply message stored in the cache memory 11*f* (or the memory 11*d*) to the client 2 when a new request is of the same data file which has been previously requested.

In this way, if the information (meta-information, file data or the like) is one having relatively high access occurrence frequency, a reply message for the information is cached on the side of the redirector 11 and the reply message is returned from the redirector 11 directly to the client 2 without being transferred to the NFS server 12-*i*. With this arrangement, the replying speed for the information, having relatively high access occurrence frequency to the client 2, can be remarkably improved, with the result that the processing speed and processing performance of the subject system 1 can be dramatically improved.

Now, arrangement of the NFS server 12-*i* according to the present embodiment will be hereinafter described. The NFS server 12-*i* is arranged to carry out file processing (e.g., writing, updating, reading and so on) in accordance the request sent from the redirector 11 by accessing the secondary storage unit 17 through the internal network (internal network switch) 14. The NFS server 12-*i* is also arranged to create a proper reply message and send the same to the redirector 11 so as to inform the file processing result to the client 2 which is the request-source.

Figure 5:
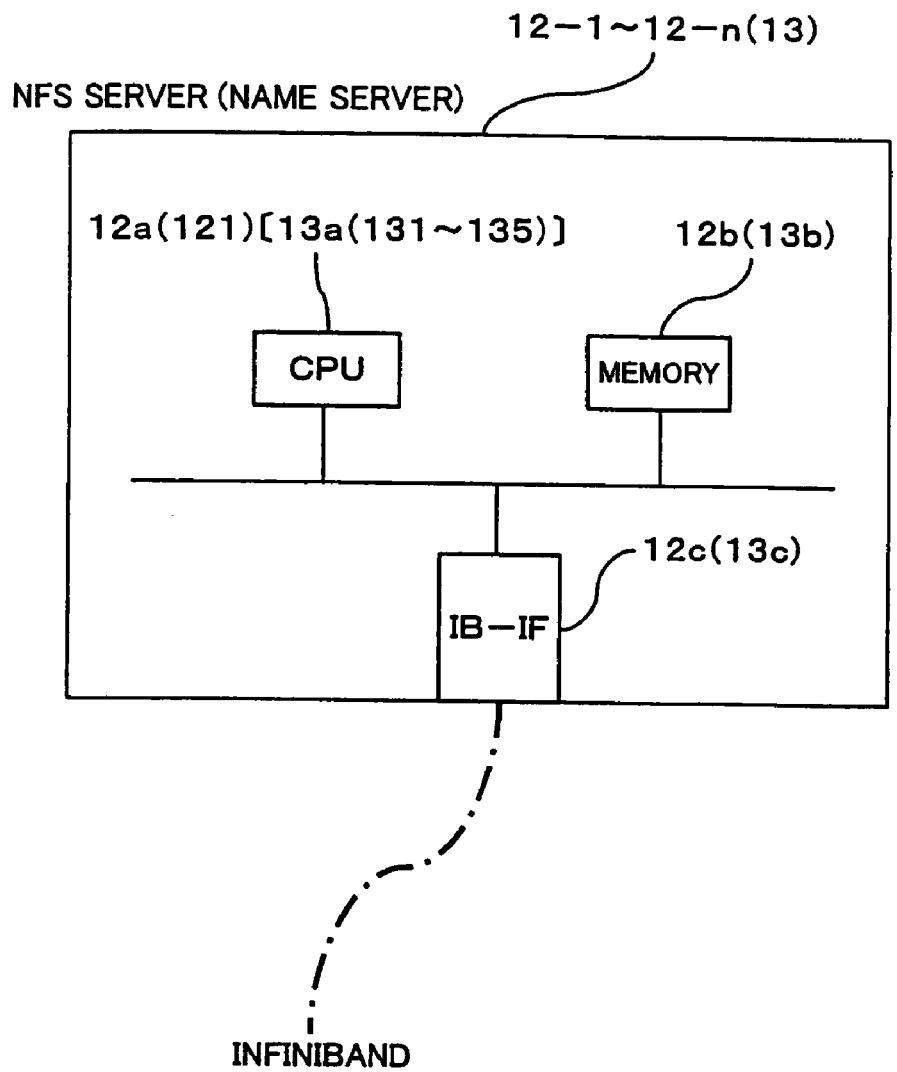
FIG. 5 is a block diagram showing an arrangement of an NFS server (name server) shown in FIG. 1.

For example, as shown in FIG. 5, each of the NFS server and the name server 12-1~12-*n* (13), respectively, are provided with a CPU (Central Processing Unit)12*a*-(121)[13*a* (131~135)], a memory (main storage unit) 12*b* (13*b*) and an interface card (IB-IF) 12*c* (13*c*) equipped with an interface (protocol conversion) with the internal network 14 shown in FIG. 1. When the CPU 12*a* reads an NFS server software (program) stored in the memory 12*b*, the NFS server 12-*i* is operated so as to realize the foregoing functions.

At this time, if respective servers 12-*i* manage the file name independently, file data can be attached with different management file names by respective NFS servers 12-*i* in spite of the fact that the file data has the same substance. Conversely, file data can be attached with the same management file name by respective NFS servers 12-*i* in spite of the fact that each of the file data has different substance, thereby leading to contention for file access among the NFS servers 12-*i*.

In order to avoid the above-described inconvenience, the name server 13 is introduced into the system. That is, the name server 13 places meta-information access from all of the NFS servers 12-*i* under the unified control, whereby the file data handled by all NFS servers 12-*i* are given file names based on the unified control. Thus, the file access contention among the NFS servers 12-*i* can be avoided. If the system is provided with the name server 13, the reliability of the subject system 1 can be remarkably improved in file sharing.

As shown in FIG. 1, the subject storage system 1 is provided with two name servers 13, one for current use and another as a spare, in order to allow the storage system 1 to cope with any abnormal incident such as a trouble (down) or the like. Further, these name servers 13 are made to have the same arrangement as that of the NFS servers 12-*i* (see FIG. 5) in terms of hardware arrangement. Accordingly, the references to the CPU 12*a*(121)[13*a*(131~135)], the memory (main storage unit) 12*b*(13*b*) and the interface card (IB-IF) 12*c*(13*c*) indicate the components of name servers 13 and NFS servers 12*i* to 12*n*, according to an embodiment of the present invention. That is, each of the name servers 13 is arranged to include a CPU 13*a*, a memory (main storage unit) 13*b*, and an interface card 13*c* (as illustrated in FIG. 5 with respect to one of the NFS servers 12-1 to 12*n*) and the name servers 13) that are equipped with an interface with the internal network 14. Also in this case, the name server software (program) stored in the memory 13*b* is read by the CPU 13*a*, and the CPU 13*b* is operated in accordance with the read program, whereby the above-described function of the name server 13 is realized.

Figure 8:
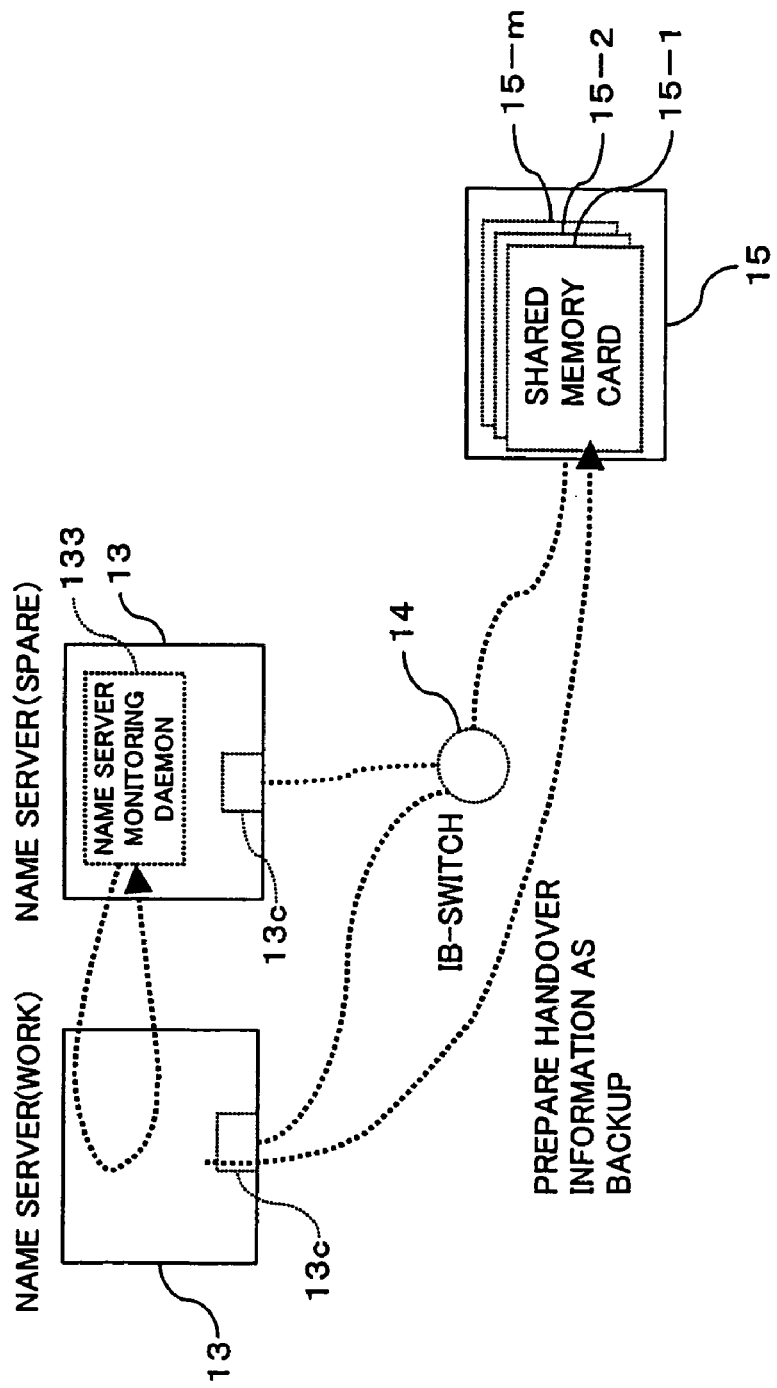
FIG. 8 is a block diagram for explaining an operation taken place when handover information of the name server is stored in the shared memory shown in FIG. 1 as a backup.

Now, the arrangement of the shared memory 15 will be hereinafter described. The shared memory 15 is a memory unit which can be accessed from each of the redirector 11, the NFS server 12-*i* and the name server 13 through the internal network 14. For example, when a certain NFS server 12-*i* or the working name server 13 comes to be down (suffers from failure), the task which is being done in the NFS server 12-*i* or the name server 13 should be relayed to another NFS server 12-*k* (k=1 to n, K≠i) or the spare server 13. The shared memory 15 has information necessary for the NFS server 12-*i* or the name server 13 to relay the task stored therein so that each of the information pieces is held (as a backup) in a memory card (shared memory card) 15-1 to 15-*m* (m is a natural number) for the server 12-*i* and the name server 13 independently (see FIGS. 6 and 8).

That is, the above-described NFS server 12-*i* (CPU 12*a*) or the name server 13 (CPU 13*a*) is arranged to include a handover information recording unit 121 (131) (see FIG. 5) for recording, in the shared memory 15, information which is necessary for the NFS server 12-*i* or the name server 13 to relay the task to be done to another NFS server 12-*i* or the spare name server 13 in order to cope with any abnormal incident brought about in the network.

Figure 6:
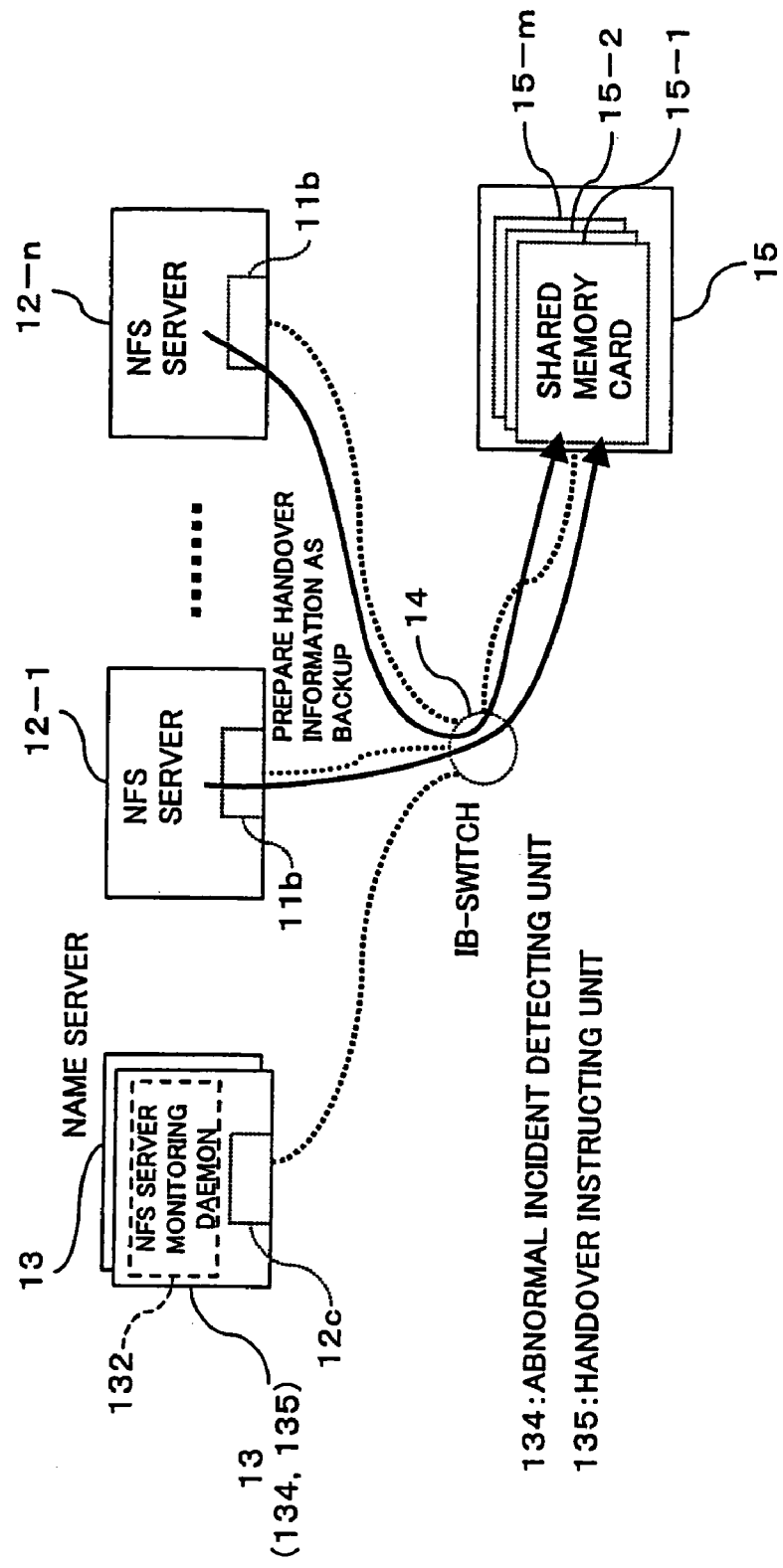
FIG. 6 is a block diagram for explaining an operation in which handover information of the NFS server is stored in a shared memory shown in FIG. 1 as a backup.

As for example schematically shown in FIG. 6, trouble causing the NFS server 12-*i* to be down is detected by effecting the monitoring the NES server monitoring daemon 132 on the background by the working name server 13 (CPU 13*a*). On the other hand, trouble causing the working name server 13 to be down is detected by effecting the monitoring of the NFS server monitoring daemon 133 on the background by the spare name server 13 (CPU 13*a*).

Figure 7:
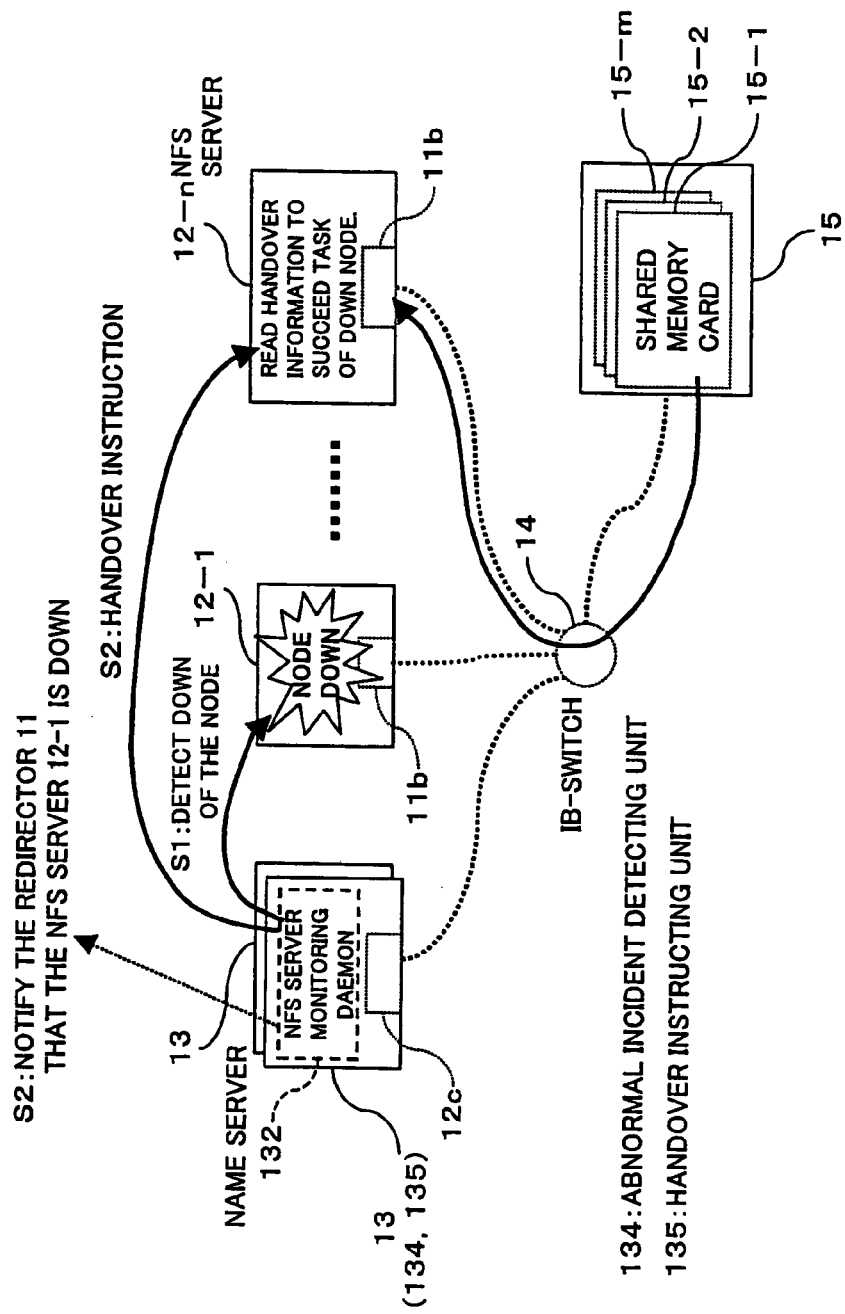
FIG. 7 is a block diagram for explaining an operation in which an NFS server succeeds a task which was to be done by a down NFS on the bases of the handover information stored in the shared memory shown in FIG. 6 as a backup.

As schematically shown in FIG. 7, when it is detected that the NFS server 12-*i* is down (Step S1), the working name server 13 (CPU 13*a*) issues an instruction to an NFS server 12-*k* other than the down NES server 12-*i* (e.g., an NFS server 12-*k* having relatively light load applied thereto) so that the NFS server 12-*k* succeeds the task which is being done by the down NFS server 12-*i*.

In this way, upon receiving the instruction of succeeding the task, the NFS server 12-*k* (CPU 12*a*) has access to the shared memory 15 through the internal network 14, and reads handover information stored in the shared memory 15 as backup, and then succeeds the task of the NFS server 12-*i* which was down due to trouble (Step S3). At this time, the redirector 11 (network processor 11*c*) receives the above notification from the name server 13, and in response to the receiving of the notification, the redirector 11 is prohibited from transferring a request, by the request transferring unit 112, to the down NFS server 12-*i*.

Namely, in this case, the name server 13 (CPU 13*a*) is arranged to include functions of an abnormal incident detecting unit 134 (see FIG. 6) for detecting an abnormal incident brought about in the NFS server 12-*i*, and as a relaying instruction generating unit 135 (see FIG. 6) for generating an instruction to the NFS server 12-*k* other than the NFS server 12-*i* so that the NFS server 12-*k* succeeds the task of the NFS server 12-*i* suffering from the abnormal incident based on the handover information stored in the shared memory 15, when the abnormal incident detecting unit 134 detects the abnormal incident in the NFS server 12-*i*.

As described above, according to the arrangement of the present storage system, even if one of the NFS server 12-*i* or the name server 13 is down, the NFS server 12-*k* other than the NFS server 12-*i* or the name sever 13 for the spare use can succeed the task being done in the NFS server 12-*i* or the name server 13. Therefore, the storage system 1, as a whole, can continue the file processing in a normal manner. Accordingly, the anti-trouble resistance of the storage system can be remarkably improved.

Although descriptions have been made on the redundancy of the NFS servers 12-*i* and the name sever 13, it is needless to say that the redirector 11 may be similarly made redundant. Furthermore, while in the above described arrangement the spare use name server 13 succeeds the current name server 13 when the current name server 13 is down, any of the NFS server 12-*i* may succeed the task of the current name server 13.

Now, description will be concretely made on the processing carried out in the redirector 11 and the NFS server 12-*i* when the request is transferred from the redirector 11 to the NFS server 12-*i*.

When the redirector 11 receives from the client 2, a file access request indicating that file data is to be written, for example, the redirector 11 analyzes the file access request with the request analyzing unit 111.

Figure 12:
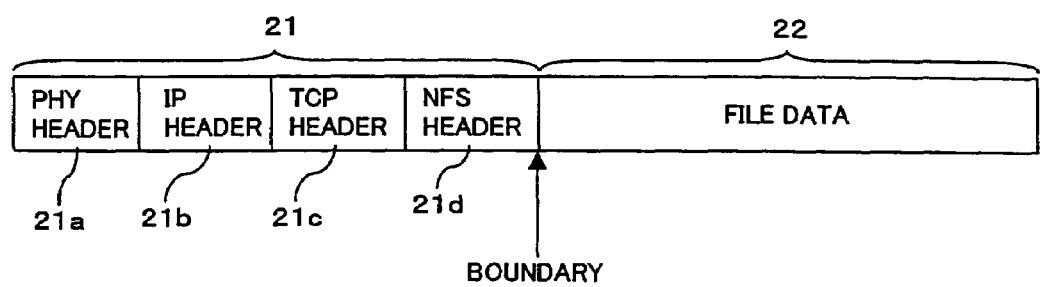
FIG. 12 is a diagram showing an example of format of the file access request shown in FIGS. 9 to 11.

As for example shown in FIG. 12, the above-described file access request is made up of a header portion 21 and a substantial file data portion 22, the header portion 21 being composed of a physical layer header (Phy Header) 21*a*, an IP header (Internet Protocol Header) 21*b*, a TCP header (Transmission Control Protocol Header) 21*c*, an NSF header 21*d* and so on, the substantial file data portion 22 being composed of substantial file data to be written into the secondary storage unit 17.

Figure 9:
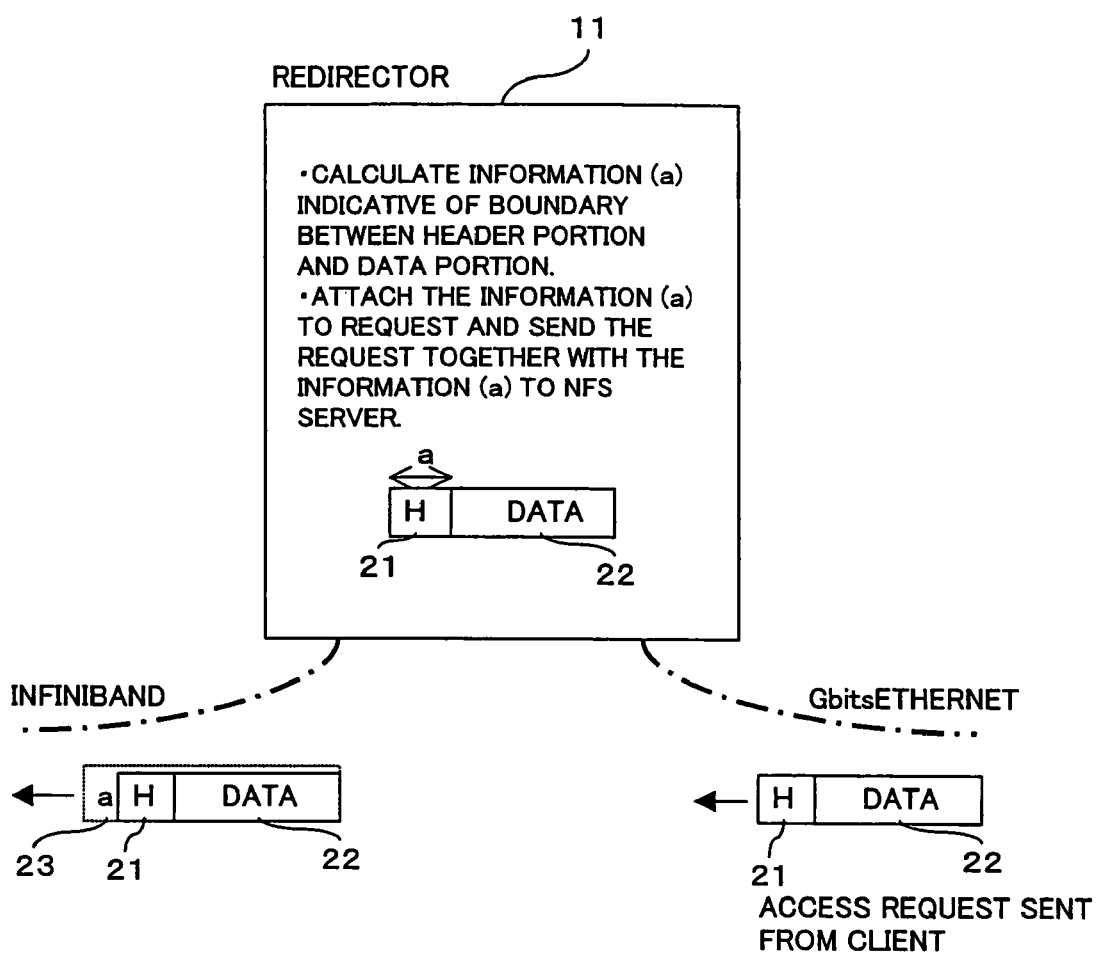
FIG. 9 is a block diagram for explaining an operation in which the redirector shown in FIG. 1 determines boundary information of a file access request.

As schematically shown in FIG. 9, the request analyzing unit 111 determines a position at which the substantial file data in the file access request starts, i.e., the boundary between the header portion 21 and the substantial file data portion 22 as a header offset value [boundary information; e.g., the number of bits "a" counted from the head portion of the file access request message] 23. The thus determined boundary information 23 is sent to the request transferring unit 112, and the request transferring unit 112 sends the file access request together with the boundary information 23 attached thereto, to an NFS server 12-*i* as a transfer destination.

That is, as shown in FIG. 2, the request analyzing unit 111 is arranged to include functions of a header offset value analyzing unit 111*a* and a header offset value adding unit 111*b*, the header offset value analyzing unit 111*a* analyzing the received file access request and determining the header offset value 23 indicative of the boundary position between the header portion 21 and the substantial file data portion 22 of the file access request, the header offset value adding unit 111*b* attaching the header offset value 23 obtained by the header offset value analyzing unit 111*a* to the file access request which is to be sent to the NFS server 12-*i*.

Figure 10:
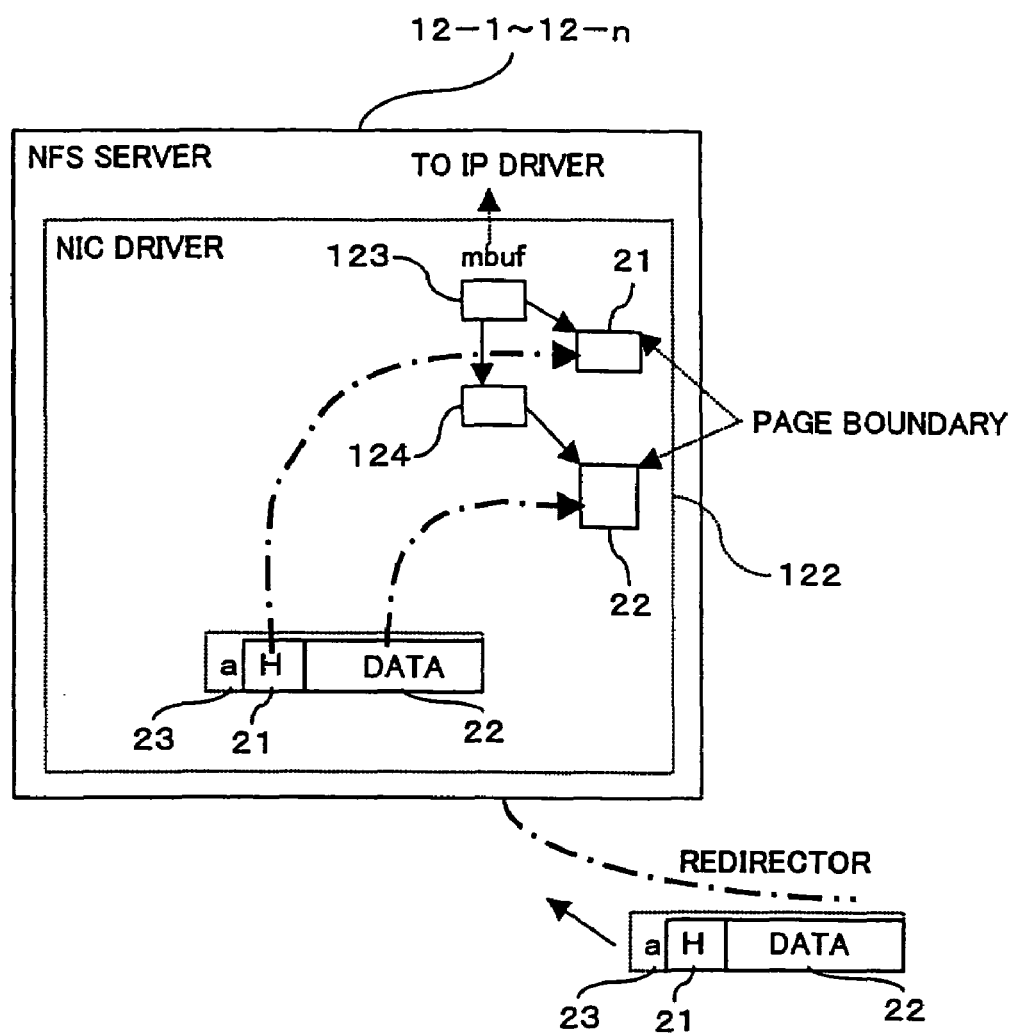
FIG. 10 is a block diagram for explaining an operation in which the NFS server shown in FIG. 1 creates a zero copy status within the kernel, based on the boundary information of the file access request illustrated in FIG. 9.

Thereafter, on the side of the NFS server 12-*i*, the NIC (Network Interface Card) driver (network driver) 122 allocates starting addresses of the substantial file data portion 22 and regions other than the substantial file data portion 22 to page boundaries (page boundary (separated region); buffers (mbuf) 123 and 124) which are handled by within-kernel higher rank layer (kernel higher rank layer) (NFS processing layer) based on the header offset value 23 added to the file access request on the side of the redirector 11 as described above (see FIG. 10).

Figure 11:
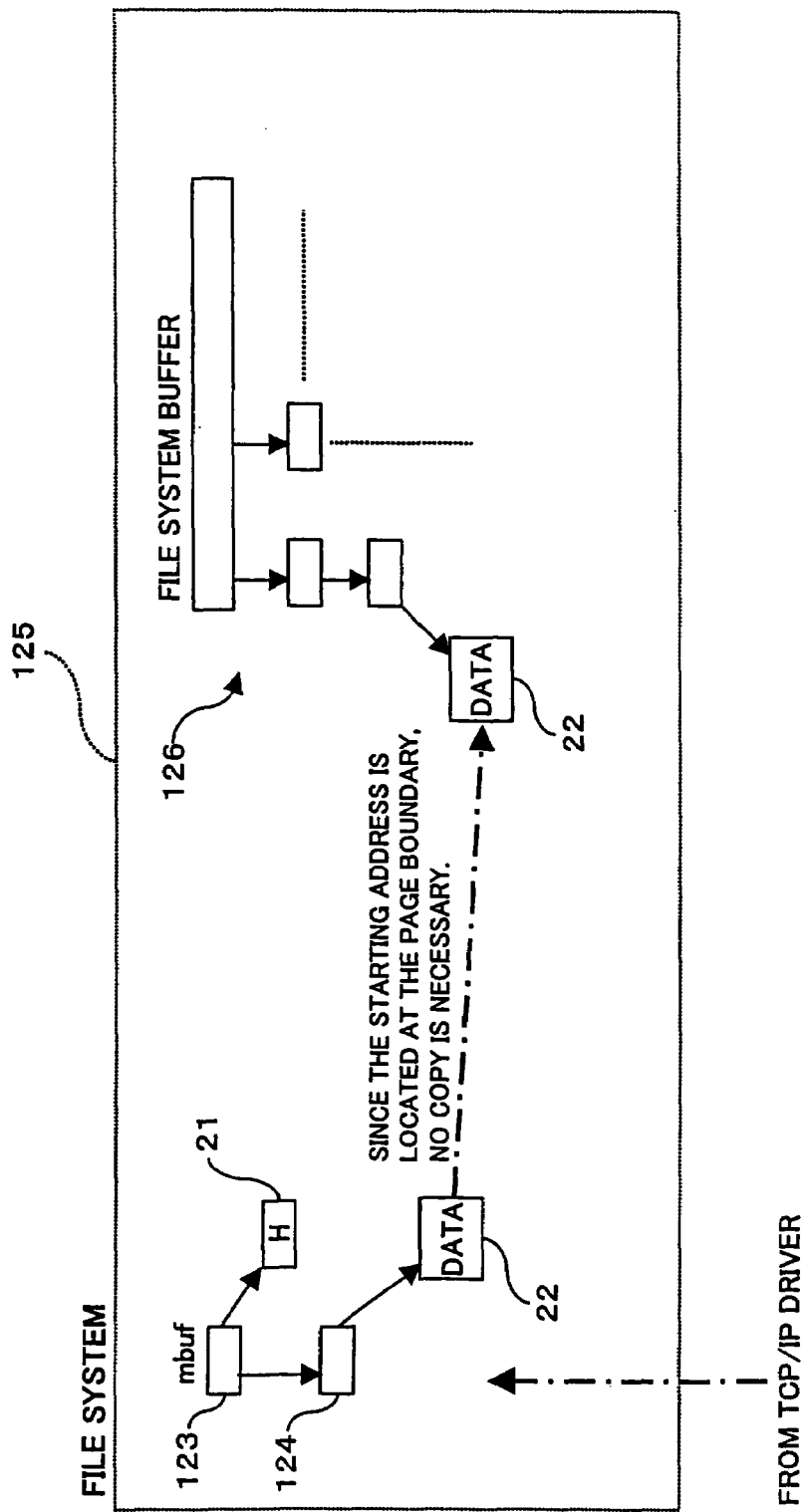
FIG. 11 is a block diagram for explaining an operation in which the NFS server, shown in FIG. 1, creates a zero copy status within the kernel, based on the boundary information of the file access request illustrated in FIG. 9.

According to the above-described processing scheme, as for example schematically shown in FIG. 11, when the file access request reaches the file system unit 125 in the kernel higher rank layer, the starting address (pointer) of the substantial file data portion 22 is brought to the pointer for replacing the pointer which is guiding the data to the file system buffer 126. Only with this operation, the data can be transferred to the file system buffer 126 without copying (map switching) the data. In other words, no copy can be achieved within the kernel area. Accordingly, DMA (Direct Memory Access) can be realized at a high speed, and the processing speed and processing performance of the NFS server 12-*i* can be remarkably improved.

In the above case, it is considered that the boundary between the header portion 21 and the substantial file data portion 22 is determined on the side of the NIC driver 122. In this case, however, the amount of task (header analyzing) imposed on the NIC driver 122 will be increased. (Usually, the NIC driver 122 analyzes only the physical layer header 21*a*.) Therefore, as described above, it is recommended that the redirector 11 is arranged to have the analyzing function (request analyzing unit 111) for analyzing the header portion 21 from the first, and the boundary is determined on the side of the redirector 11. With this arrangement, the layer of the NIC driver can be protected from a heavy task (and hence the layer of the NIC driver can be free from being lowered in its processing capability) and kernel zero copy can be achieved within the higher rank layer (NFS processing layer).

According to the arrangement of the present embodiment as described above, the storage system 1 is arranged to include within the system 1, the redirector 11, the plurality of NFS servers 12-*i*, the name server 13, the shared memory 15, and the secondary storage unit 17, and these components are connected by means of the high speed internal network 14. Therefore, the component such as the NFS server 12-*i* or the secondary storage unit 17 can be additionally provided in the network depending on necessity without any difficulties. Furthermore, since each of the NFS servers 12-*i* does not require independent maintenance operation, the storage system 1 can secure scalability in terms of performance and capacity which can cope with the enlargement of band of the external network 3 (e.g., a local area network operating at a transmission rate of up to 10 Gbps) with sufficiently low cost.

In particular, according to the above-described arrangement, the redirector 11 controls the task delivery scheme. That is, the amount of task is delivered to respective NFS servers 12-*i* so that each of the NFS servers 12-*i* is supplied with substantially an equal amount of task, the task of a request concerning the same file data is assigned to the same NFS server 12-*i*, and a specially cached reply message is prepared not on the side of NFS server 12-$i$ but on the side of redirector 11 so as to respond to a request of a file of which access occurrence frequency is relatively high. With this arrangement, the processing speed and processing performance of the system is dramatically improved, thereby realizing scalability in terms of performance and capacity which can cope with a LAN operating at a transmission rate of up to 10 Gbps.

(B) Description of First Modification

While in the above-described storage system 1 the memory 12$b$ provided in each of the NFS servers 12-$i$ is not particularly arranged in terms of its capacity, one of the memory 12$b$ may be arranged to have a capacity larger than that of the memory of any other NFS servers 12-$i$ so that the NFS server is made to function as a cache server 12' (see FIG. 1), and that fundamentally any file access by way of the cache server 12' is processed by only writing and reading on the memory 12$b$ so as to respond to the side of the client 2.

If it is detected that a certain file request becomes one having access occurrence frequency in a predetermined period of time is higher than a certain level (threshold level), a special reply message is cached in the memory 12$b$ so that the cache server 12' responds to the request.

This scheme will be more concretely described. Initially, the access occurrence frequency of respective files is monitored on the side of the redirector 11. If any file having access occurrence frequency higher than a certain threshold level is found, the redirector 11 issues an instruction to the name server 13, the NFS servers 12-$i$ and the cache server 12' so that the access concerning the file having access occurrence frequency higher than the certain threshold level is to be processed in the cache server 12'.

At this time, the redirector 11 (request transferring unit 112) is arranged to transfer a request concerning a file of which access occurrence frequency is relatively high, to the cache server 12'. With this arrangement, the cache server 12' is exclusively obliged to carry out the task of the request concerning a file of which access occurrence frequency is relatively high, without accessing to the secondary storage unit 17. Therefore, great contribution can be expected to the improvement in the processing speed and processing performance of the storage system 1.

The task delivery scheme of the redirector 11 may be further arranged as described below. That is, if the access occurrence frequency of a certain file is lowered (i.e., the access occurrence frequency of the file cached in the memory 12$b$ of the cache server 12' falls below a certain threshold level), the redirector 11 issues an instruction to the name server 13, the NFS servers 12-$i$ and the cache server 12' so that a proper NFS server (e.g., a server having relatively light task applied thereto) is designated and the task of processing the request concerning the certain file is assigned to the designated server.

In this case, the redirector 11 (request transferring unit 112) changes the transferring destination of the request from the cache server 12' to any servers 12-$i$ other than the cache server 12'. Thus, the file data of which access occurrence frequency is lowering can be prevented from being cached in the cache server 12'. As a result, the memory capacity necessary for the cache server 12' can be reduced. Alternatively, the cache server 12' comes to have more allowance in processing tasks. Therefore, the processing performance can be more improved.

(C) Description of Second Modification

Figure 13:
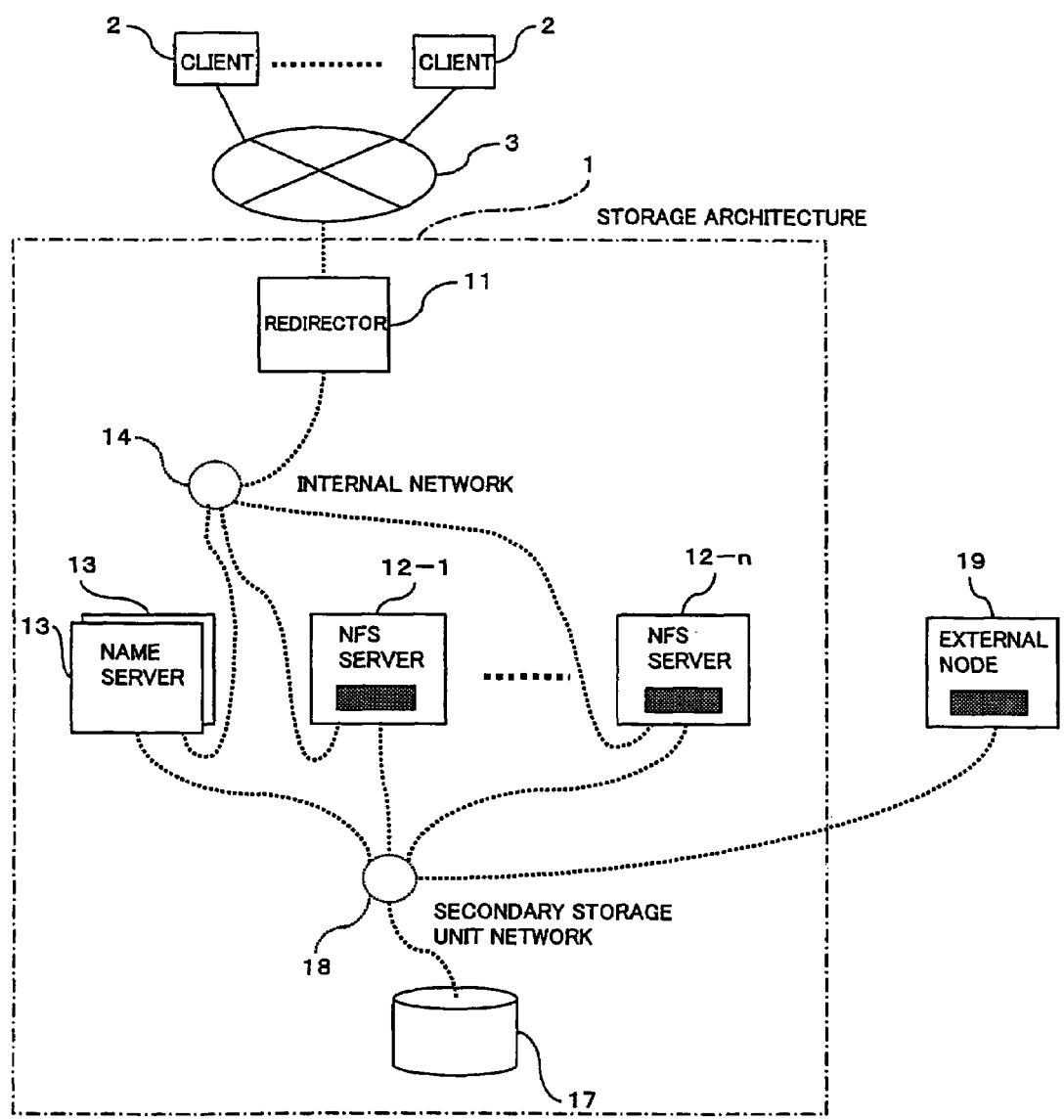
FIG. 13 is a block diagram showing an arrangement of the storage system shown in FIG. 1 in which an external node is allowed to have access to a secondary storage unit.

The connection arrangement of the secondary storage unit 17 may be further modified as, for example, shown in FIG. 13. That is, the secondary storage unit 17 is connected to the name server 13 and the NFS server 12-$i$ by way of an FC switch 18, thereby to form a secondary storage unit network, and the FC switch 18 is connected to the external node 19. Thus, the secondary storage unit 17 permits access from the external node 19. In this case, however, the file system operated by the external node 19 is requested to be the same as the file system within the storage system 1 (in the above-described case, the frame portions applied with halftone notation in FIG. 13 are the objects of the requirement).

If the connection arrangement around the secondary storage unit 17 is modified as described above, in order to avoid contention in access with the NFS servers 12-$i$ provided within the system 1, any arbitration control is requested on the access from the external node 19. However, external node 19 is allowed to have access to the file provided in the storage system 1.

Figure 14:
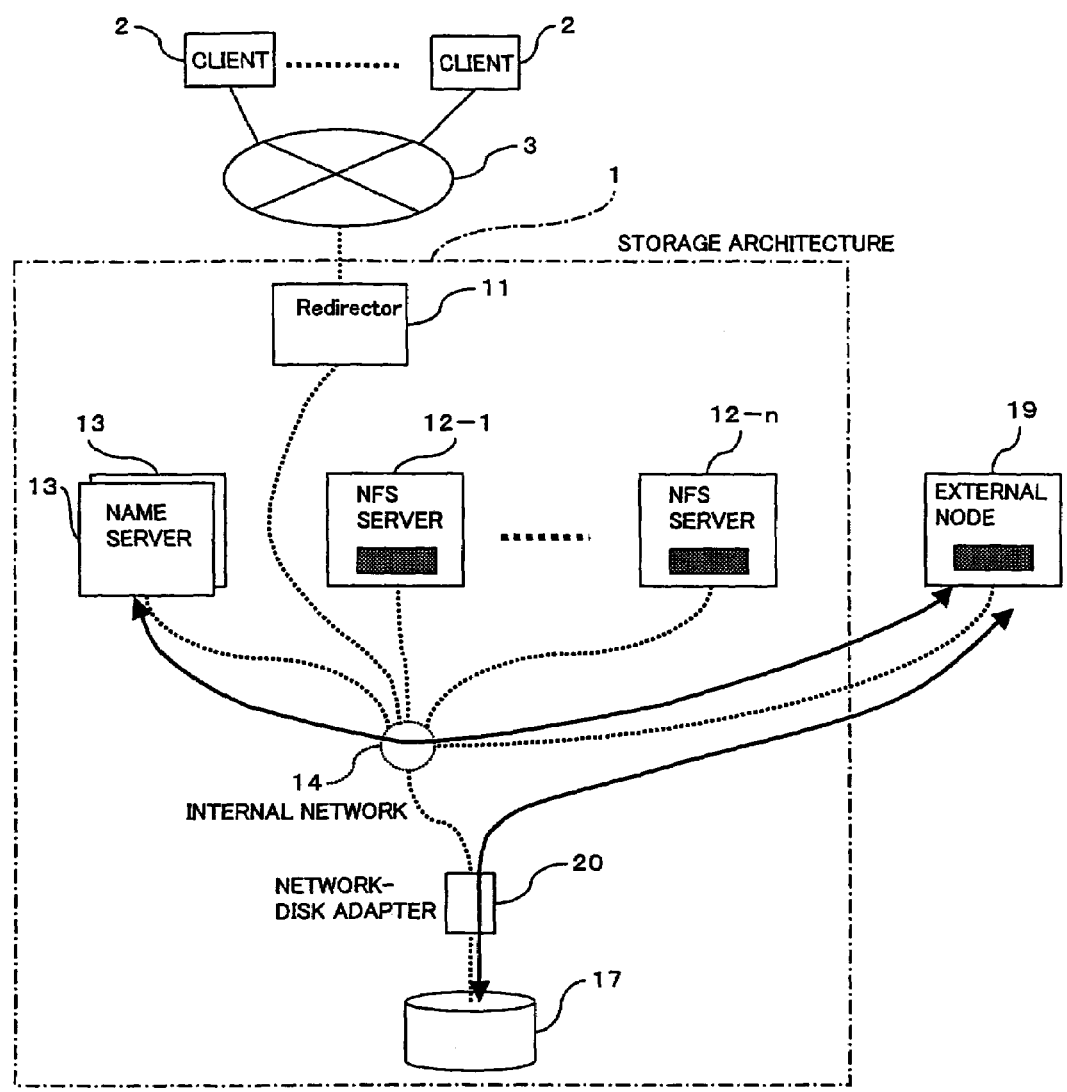
FIG. 14 is a block diagram showing an arrangement of the storage system, shown in FIG. 1, in which the external node is allowed to have access to the name server.

However, as shown in FIG. 14, for example, if the system is arranged so that the external node 19 is allowed to have access to the name server 13, the access from the external node 19 will be placed under the control of file name management effected in the system 1. Therefore, the external node 19 is allowed to have access to the files provided in the system 1 without the above-described arbitration control. While the above description is made with reference to FIG. 14 on the case in which the name server 13 is allowed to have access by way of the internal network 14, it is needless to say that, as shown in FIG. 13, the name server 13 may be allowed to have access by way of the secondary storage unit (FC switch 18).

Figure 15:
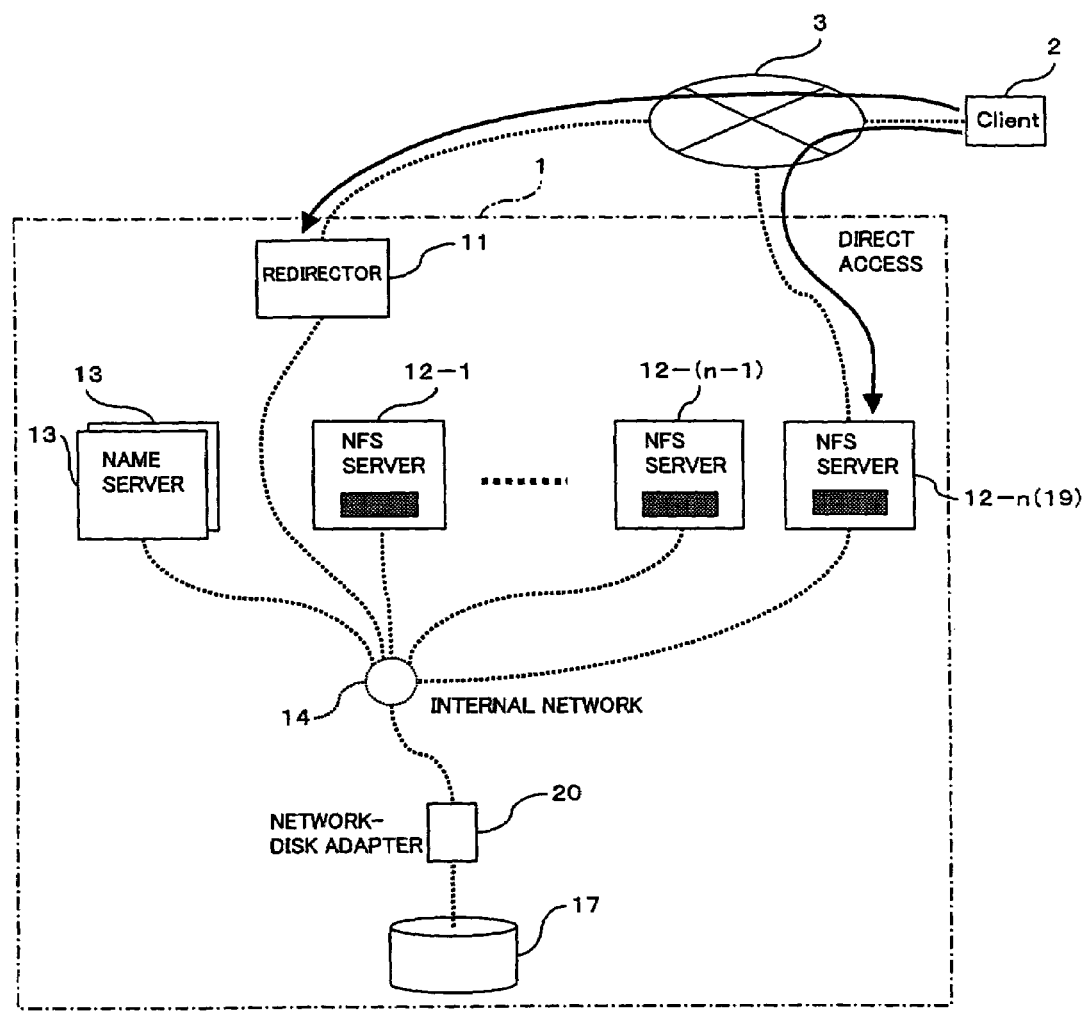
FIG. 15 is a block diagram showing an arrangement of the storage system, shown in FIG. 1, in which the external node is allowed to have access to the NFS server in a direct manner and in a manner by way of the redirector.
Figure 16:
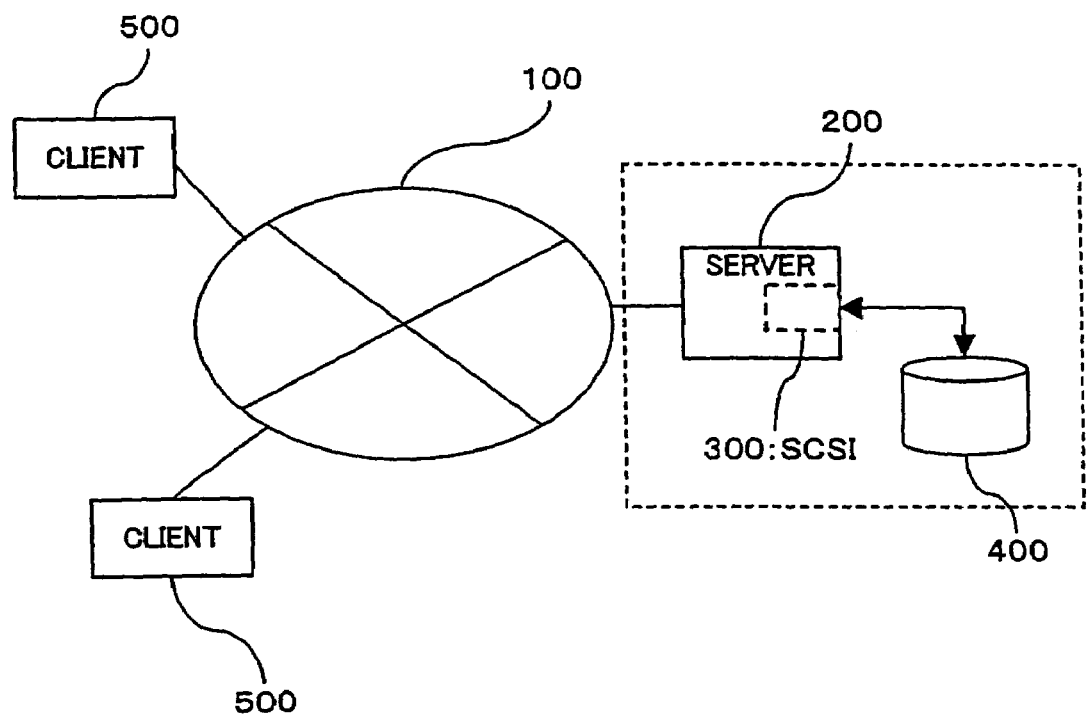
FIG. 16 is a block diagram for explaining a conventional method of realizing file sharing among a plurality of nodes (clients) involved in a network.

While in the above arrangement, the NFS servers 12-$i$ and the external node 19 are separately provided, the NFS servers 12-$i$ and the external node 19 may be unitarily arranged as, for example, shown in FIG. 15. In other words, the file server 12-$i$ is arranged to effect file processing, corresponding to the request is directly received from the external network 3, on the secondary storage unit.

According to the above arrangement, if a certain client 2 tries to access the storage system 1 by way of the redirector 11, the NFS server 12-$i$ functions as the above-described file server of the storage system 1. If the client 2 tries to access the storage system 1 directly, the NFS server 12-$i$ functions as an ordinary server which responds to the client not by way of the redirector 11 but directly. In other words, the above-described arrangement allows the clients 2 to access in two manners, i.e., to access by way of the NFS server 12-$i$ and to access not by way of the NFS server 12-$i$.

In either of the cases, the present system allows the direct access from the outside. Therefore, it becomes possible to realize harmonization with another storage architecture (e.g., SAN (Storage Area Network) or the like). In FIGS. 14 and 15, reference numeral 20 represents a network disk adapter equipped with an interface component providing interface between the internal network 14 and the secondary storage unit 17.

While in the arrangements illustrated in FIGS. 13 to 15 the aforementioned shared memory 15 is omitted, it is needless to say that the shared memory 15 may be provided in the arrangements. If these arrangements are provided with the shared memory 15, backup processing can be effected even in the arrangement illustrated in FIGS. 13 to 15.

(D) Other Disclosure

While in the above embodiment descriptions have been made on a case in which the infiniband is applied as the internal network 4 and gigabit Ethernet is applied as the external network 3, it is needless to say that any high speed network other than these types of network can be employed for system building.

Further, the name server 13 or the shared memory 15 should not always be provided. That is, the purpose of the present invention can be satisfactorily achieved even if either of or both of these components are omitted. Furthermore, while in the above embodiments an NFS is employed as the file server, the present invention is not limited to this arrangement but other type of file system can be employed without any difficulties.

While in the above embodiment it is presupposed that the internal network 14 has a capacity (transmission rate) of about 4 to 10 Gbps, the internal network 14 can cope with the expansion of band of the external network 3 by variably settling the transmission rate depending on the expansion of band of the external network 3.

While several embodiments and modifications have been described above, the present invention is not limited to these embodiments but various changes and modifications other than the above embodiments can be effected without departing from the gist of the present invention.

What is claimed is:

1. A storage system, comprising:
    a storage unit storing therein file data;
    a plurality of file servers effecting file processing on the storage unit in response to a received request;
    a file server administrating node unitarily administrating transfer processing for transferring a client request received via an external network as said received request to one of the plurality of file servers and reply processing for sending a reply message in response to the received client request to a client corresponding to the client request;
    an internal network interconnecting the storage unit, the plurality of file servers and the file server administrating node so that communication is effected in the internal network;
    a header offset value analyzing unit analyzing the client request so as to calculate a header offset value indicative of a position of a boundary between a header portion and a substantial file data portion; and
    a header offset value adding unit adding the header offset value obtained by the header offset value analyzing unit to the client request which is transferred to one of the file servers.

2. The storage system according to claim 1, wherein the internal network is connected with a name server for unitarily administrating names of file data handled by the plurality of file servers.

3. The storage system according to claim 2, wherein the internal network is connected with a shared memory and the shared memory is accessible from the file server administrating node, the plurality of file servers and the name server.

4. The storage system according to claim 3, wherein the file server administrating node comprises:
    a request analyzing unit analyzing contents of the client request received, and
    a request transferring unit transferring the client request received to a specified file server from the plurality of file servers in accordance with the analysis by the request analyzing unit.

5. The storage system according to claim 4, wherein the file server administrating node further comprises:
    a transferring operation history recording unit recording transferring operation history with respect to a previous request handled by the request transferring unit, and
    where the request transferring unit is implemented to transfer a subsequent request regarding file data having an identical file data name to the specified file server based on the transferring operation history recorded by the transferring operation history recording unit.

6. The storage system according to claim 4, wherein the file server administrating node further comprises:
    a load monitoring unit monitoring a load of the specified file server, and
    where the request transferring unit is implemented to transfer the client request received to one of the plurality of file servers having a relatively light load based on monitoring of the load by the load monitoring unit.

7. The storage system according to claim 4, wherein at least one of the file servers comprises:
    a main storage unit caching the file data of the storage unit, whereby the at least one file servers functions as a cache server for executing file processing in the main storage unit in accordance with received requests.

8. The storage system according to claim 3, wherein the name file server is provided with a handover information recording unit recording handover information, which is necessary for any one of the plurality of the file servers to succeed to a task of another one of the plurality of file servers in preparation for an abnormal incident, in the shared memory.

9. The storage system according to claim 8, further comprising:
    an abnormal incident detecting unit detecting the abnormal incident occurring in any one of the plurality of file servers; and
    a succession instructing unit issuing an instruction to any one of the plurality of file servers other than a file server among the plurality of file servers having the abnormal incident occurring so that any one of the plurality of file servers succeeds the task of the file server having the abnormal incident occurring based on the handover information stored in the shared memory, when the abnormal incident detecting unit detects that an abnormal incident has occurred therein.

10. The storage system according to claim 2, wherein the file server administrating node comprises:
    a request analyzing unit analyzing contents of the client request received, and
    a request transferring unit transferring the client request received to a specified file server from the plurality of file servers in accordance with the analysis by the request analyzing unit.

11. The storage system according to claim 10, wherein the file server administrating node further comprises:
    a transferring operation history recording unit recording transferring operation history with respect to a previous request handled by the request transferring unit, and
    where the request transferring unit is implemented to transfer a subsequent request regarding file data having an identical file data name to the specified file server based on the transferring operation history recorded by the transferring operation history recording unit.

12. The storage system according to claim 10, wherein the file server administrating node further comprises:
    a load monitoring unit monitoring a load of the specified file server, and
    where the request transferring unit is implemented to transfer the client request received to one of the plurality of file servers having a relatively light load based on monitoring of the load by the load monitoring unit.

13. The storage system according to claim 10, wherein at least one of the file servers comprises:
    a main storage unit caching the file data of the storage unit, whereby the at least one file servers functions as a cache server for executing file processing in the main storage unit in accordance with received requests.

14. The storage system according to claim 2, wherein the name server is arranged to allow access from an external node.

15. The storage system according to claim 1, wherein the internal network is connected with a shared memory and the shared memory is accessible from the file server administrating node and the plurality of file servers.

16. The storage system according to claim 15, wherein the file server administrating node comprises:
   a request analyzing unit analyzing contents of the client request received, and
   a request transferring unit transferring the client request received to a specified file server from the plurality of file servers in accordance with the analysis by the request analyzing unit.

17. The storage system according to claim 16, wherein the file server administrating node further comprises:
   a transferring operation history recording unit recording transferring operation history with respect to a previous request handled by the request transferring unit, and
   where the request transferring unit is implemented to transfer a subsequent request regarding file data having an identical file data name to the specified file server based on the transferring operation history recorded by the transferring operation history recording unit.

18. The storage system according to claim 16, wherein the file server administrating node further comprises:
   a load monitoring unit monitoring a load of the specified file server, and
   where the request transferring unit is implemented to transfer the client request received to one of the plurality of file servers having a relatively light load based on monitoring of the load by the load monitoring unit.

19. The storage system according to claim 16, wherein at least one of the file servers comprises:
   a main storage unit caching the file data of the storage unit, whereby the at least one file server functions as a cache server for executing file processing in the main storage unit in accordance with received requests.

20. The storage system according to claim 15, wherein the name file server is provided with a handover information recording unit recording handover information, which is necessary for any one of the plurality of the file servers to succeed to a task of another one of the plurality of file servers in preparation for an abnormal incident, in the shared memory.

21. The storage system according to claim 20, further comprising:
   an abnormal incident detecting unit detecting the abnormal incident occurring in any one of the plurality of file servers; and
   a succession instructing unit issuing an instruction to any one of the plurality of file servers other than a file server among the plurality of file servers having the abnormal incident occurring so that any one of the plurality of file servers succeeds the task of the file server having the abnormal incident occurring based on the handover information stored in the shared memory, when the abnormal incident detecting unit detects that an abnormal incident has occurred therein.

22. The storage system according to claim 1, wherein the file server administrating node comprises:
   a request analyzing unit analyzing contents of the client request received, and
   a request transferring unit transferring the client request received to a specified file server from the plurality of file servers in accordance with the analysis by the request analyzing unit.

23. The storage system according to claim 22, wherein the file server administrating node further comprises:
   a transferring operation history recording unit recording transferring operation history with respect to a previous request handled by the request transferring unit, and
   where the request transferring unit is implemented to transfer a subsequent request regarding file data having an identical file data name to the specified file server based on the transferring operation history recorded by the transferring operation history recording unit.

24. The storage system according to claim 22, wherein the file server administrating node further comprises:
   a load monitoring unit monitoring a load of the specified file server, and
   where the request transferring unit is implemented to transfer the client request received to one of the plurality of file servers having a relatively light load based on monitoring of the load by the load monitoring unit.

25. The storage system according to claim 22, wherein at least one of the file servers comprises:
   a main storage unit caching the file data of the storage unit, whereby the at least one file server functions as a cache server for executing file processing in the main storage unit in accordance with received requests.

26. The storage system according to claim 1, wherein one of the file servers comprises:
   a network driver copying the header portion and the substantial file data portion of the client request to respective different regions for a message which are handled by a higher rank layer of a kernel.

27. The storage system according to claim 1, wherein the file server administrating node comprises:
   a caching unit caching a reply message for responding to the client request concerning a particular file data having relatively high request occurrence frequency, and
   a responding unit responding to the client request with the reply message stored in the caching unit upon determining that the client request is one concerning the particular file data.

28. The storage system according to claim 1, wherein the storage unit is arranged to allow access from an external node.

29. The storage system according to claim 1, wherein at least one of the plurality of file servers is arranged to effect the file processing on the storage unit when the client request is directly received from the external network.

30. A storage system, comprising:
   a storage unit storing therein file data;
   a plurality of file servers effecting file processing on the storage unit in response to a received request;
   a file server administrating node unitarily administrating transfer processing for transferring a client request received via an external network as said received request to one of the plurality of file servers and reply processing for sending a reply message in response to the client request to a client corresponding to the client request;
   an internal network interconnecting the storage unit, the plurality of file servers and the file server administrating node so that communication is effected in the internal network, the internal network being connected with a shared memory, and the shared memory being accessible from the file server administrating node, the plurality of file servers and a name server;

a request analyzing unit analyzing contents of the client request received;

a request transferring unit transferring the client request received to a specified file server from the plurality of file servers in accordance with the analysis by the request analyzing unit;

a main storage unit caching the file data of the storage unit, whereby one of the plurality of the file servers functions as a cache server for executing file processing in the main storage unit in accordance with received requests;

wherein the functions as the cache server include caching file data having request occurrence frequency within a constant time period equal to or more than a predetermined level, and the request transferring unit is arranged to transfer a request corresponding to the file data, having the request occurrence frequency equal to or more than the predetermined level, to the cache server.

31. The storage system according to claim 30, wherein the request transferring unit changes a destination of the request corresponding to the file data having the request occurrence frequency from the cache server to any one of the file servers other than the cache server upon detecting that the request occurrence frequency of the file data cached in the main storage unit of the cache server is equal to or less than the predetermined level.

32. A storage system, comprising:
a storage unit storing therein file data;
a plurality of file servers effecting file processing on the storage unit in response to a received request;
a file server administrating node unitarily administrating transfer processing for transferring a client request received via an external network as said received request to one of the plurality of file servers and reply processing for sending a reply message in response to the received client request to a client corresponding to the client request;
an internal network interconnecting the storage unit, the plurality of file servers and the file server administrating node so that communication is effected in the internal network, the internal network being connected with a name server for unitarily administrating names of file data handled by the plurality of file servers;
a request analyzing unit analyzing contents of the client request received;
a request transferring unit transferring the client request received to a specified file server from the plurality of file servers in accordance with the analysis by the request analyzing unit;
a main storage unit caching the file data of the storage unit, whereby one of the plurality of the file servers functions as a cache server for executing file processing in the main storage unit in accordance with received requests;
wherein the unit functions as the cache server include caching file data having request occurrence frequency within a constant time period equal to or more than a predetermined level, and
the request transferring unit is arranged to transfer a request corresponding to the file data, having the request occurrence frequency equal to or more than the predetermined level, to the cache server.

33. The storage system according to claim 32, wherein the request transferring unit changes a destination of the request corresponding to the file data having the request occurrence frequency from the cache server to any one of the file servers other than the cache server upon detecting that the request occurrence frequency of the file data cached in the main storage unit of the cache server is equal to or less than the predetermined level.

34. A storage system, comprising:
a storage unit storing therein file data;
a plurality of file servers effecting file processing on the storage unit in response to a received request;
a file server administrating node unitarily administrating transfer processing for transferring a client request received via an external network as said received request to one of the plurality of file servers and reply processing for sending a reply message in response to the client request to a client corresponding to the client request;
an internal network interconnecting the storage unit, the file servers and the file administrating node so that communication is effected in the internal network, the internal network being connected with a name server for unitarily administrating names of file data handled by the file servers
a request analyzing unit analyzing contents of the client request received;
a request transferring unit transferring the client request received to a specified file server from the plurality of file servers in accordance with the analysis by the request analyzing unit;
a header offset value analyzing unit analyzing the client request so as to calculate a header offset value indicative of a position of a boundary between a header portion and a substantial file data portion, and
a header offset value adding unit adding the header offset value obtained by the header offset value analyzing unit to the client request which is transferred to one of the plurality of file servers.

35. The storage system according to claim 34, wherein one of the file servers comprises:
a network driver copying the header portion and the substantial file data portion of the client request to respective different regions for a message which are handled by a higher rank layer of a kernel.

36. A storage system comprising,
a storage unit storing therein file data;
a plurality of file servers effecting file processing on the storage unit in response to a received request;
a file server administrating node unitarily administrating transfer processing for transferring a client request received via an external network as said received request to one of the plurality of file servers and reply processing for sending a reply message in response to the client request to a client corresponding to the client request;
an internal network interconnecting the storage unit, the file servers and the file server administrating node so that communication is effected in the internal network, the internal network being connected with a shared memory, the shared memory being accessible from the file server administrating node and the file servers
a request analyzing unit analyzing contents of the client request received;
a request transferring unit transferring the client request received to a specified file server from the plurality of file servers in accordance with the analysis by the request analyzing unit;

a main storage unit caching the file data of the storage unit, whereby one of the plurality of the file servers functions as a cache server for executing file processing in the main storage unit in accordance with received requests;

wherein the functions as the cache server include caching file data having the request occurrence frequency within a constant time period equal to or more than the predetermined level, and the request transferring unit is arranged to transfer a request regarding the file data, having the request occurrence frequency equal to or more than the predetermined level, to the cache server.

37. The storage system according to claim 36, wherein the request transferring unit changes a destination of the request corresponding to the file data having the request occurrence frequency from the cache server to any one of the file servers other than the cache server upon detecting that the request occurrence frequency of the file data cached in the main storage unit of the cache server is equal to or less than the predetermined level.

38. A storage system, comprising:

a storage unit storing therein file data;

a plurality of file servers effecting file processing on the storage unit in response to a received request;

a file server administrating node unitarily administrating transfer processing for transferring a client request received via an external network as said received request to one of the plurality of file servers and reply processing for sending a reply message in response to the client request to a client corresponding t the client request;

an internal network interconnecting the storage unit, the plurality of file servers and the file server administrating node so that communication is effected in the internal network, the internal network being connected with a shared memory, the shared memory being accessible from the file server administrating node and the plurality of the file servers;

a request analyzing unit analyzing contents of the client request received;

a request transferring unit transferring the client request received to a specified file server from the plurality of file servers in accordance with the analysis by the request analyzing unit;

a header offset value analyzing unit analyzing the client request so as to calculate a header offset value indicative of a position of the boundary between a header portion and a substantial file data portion, and a header offset value adding unit adding the header offset value obtained by the header offset value analyzing unit to the client request which is transferred to one if the plurality of file servers.

39. The storage system according to claim 38, wherein one of the file servers comprises:

a network driver copying the header portion and the substantial file data portion of the client request to respective different regions for a message which are handled by a higher rank layer of a kernel.

40. A storage system, comprising:

a storage unit storing therein file data;

a plurality of file servers effecting file processing on the storage unit in response to a received request;

a file server administrating node unitarily administrating transfer processing for transferring a client request received via an external network as said received request to one of the plurality of file servers and reply processing for sending a reply message in response to the client request to a client corresponding to the client request;

an internal network interconnecting the storage unit, the plurality of file servers and the file server administrating node so that communication is effected in the internal network;

a request analyzing unit analyzing contents of the client request received;

a request transferring unit transferring the client request received to a specified file server from the plurality of file servers in accordance with the analysis by the request analyzing unit;

a main storage unit caching the file data of the storage unit, whereby one of the plurality of the file servers functions as a cache server for executing file processing in the main storage unit in accordance with received requests; and wherein the functions as the cache server include caching file data having request occurrence frequency within a constant time period equal to or more than a predetermined level, and the request transferring unit is arranged to transfer a request corresponding to the file data, having the request occurrence frequency equal to or more than the predetermined level, to the cache server.

41. The storage system according to claim 40, wherein the request transferring unit changes a destination of the request corresponding to the file data having the request occurrence frequency from the cache server to any one of the file servers other than the cache server upon detecting that the request occurrence frequency of the file data cached in the main storage unit of the cache server is equal to or less than the predetermined level.

42. A storage system, comprising:

a storage unit storing therein file data;

a plurality of file servers effecting file processing on the storage unit in response to a received request;

a file server administrating node unitarily administrating transfer processing for transferring a client request received via an external network as said received request to one of the plurality of file servers and reply processing for sending a reply message in response to the client request to a client corresponding to the client request;

an internal network interconnecting the storage unit, the file servers and the file server administrating node so that communication is effected in the internal network;

a request analyzing unit analyzing contents of the client request received;

a request transferring unit transferring the client request received to a specified file server from the plurality of file servers in accordance with the analysis by the request analyzing unit;

a header offset value analyzing unit analyzing the client request so as to calculate a header offset value indicative of a position of the boundary between a header portion and a substantial file data portion, and a header offset value adding unit adding the header offset value obtained by the header offset value analyzing unit to the client request which is transferred to the file server.

43. The storage system according to claim 42, wherein one of the file servers comprises:

a network driver copying the header portion and the substantial file data portion of the client request to respective different regions for a message which are handled by a higher rank layer of a kernel.

* * * * *

UNITED STATES PATENT AND TRADEMARK OFFICE
CERTIFICATE OF CORRECTION

| | |
|---|---|
| PATENT NO. | : 7,003,556 B2 |
| APPLICATION NO. | : 09/860523 |
| DATED | : February 21, 2006 |
| INVENTOR(S) | : Kazuichi Ooe et al. |

It is certified that error appears in the above-identified patent and that said Letters Patent is hereby corrected as shown below:

\*    Col. 17, line 58, delete "unit functions as" and insert --functions of--, therefor.

Col. 18, line 19, after "file (second occurrence)" insert --server--.

Col. 19, line 31, after "corresponding" delete "t the" and insert --to the--, therefor.

\*    Col. 19, line 52, after "one" delete "if" and insert --of--, therefor.

Signed and Sealed this

Fifteenth Day of August, 2006

JON W. DUDAS
*Director of the United States Patent and Trademark Office*